United States Patent Office 3,573,265
Patented Mar. 30, 1971

3,573,265
PROCESS FOR THE PRODUCTION OF VINYL CHLORIDE/VINYL ALCOHOL COPOLYMERS
Marvin Koral, 39 Round Top Road, Warren, N.J. 07060, and Elliott Farber, 16 Llanfair Lane, Trenton, N.J. 08618
No Drawing. Continuation-in-part of application Ser. No. 735,176, June 7, 1968. This application Dec. 27, 1968, Ser. No. 787,587
Int. Cl. C08f 27/14
U.S. Cl. 260—87.1                      10 Claims

ABSTRACT OF THE DISCLOSURE

Heat-stable vinyl chloride/vinyl alcohol copolymers are prepared by alcoholyzing a vinyl chloride/vinyl acetate copolymer with a lower alkanol in the presence of a strong acid catalyst and a solvent mixture comprising about 75 percent to 90 percent by weight of acetone and 10 percent to 25 percent by weight of cyclohexanone and/or tetrahydrofuran and neutralizing the reaction mixture with calcium hydroxide before isolating the vinyl chloride/vinyl alcohol copolymer.

---

This is a continuation-in-part of our copending patent application Ser. No. 735,176, which was filed on June 7, 1968 which is now U.S. Pat. 3,534,008.

This invention relates to a process for the production of vinyl chloride/vinyl alcohol copolymers that are characterized by excellent heat stability, color, clarity, adhesion, and other valuable properties.

Copolymers of vinyl chloride and vinyl alcohol are usually prepared by alcoholyzing the corresponding vinyl chloride/vinyl acetate copolymers with a lower alkanol, such as methanol or ethanol, in the presence of an acidic or alkaline catalyst. When the vinyl acetate portions of the polymer molecule are to be completely hydrolyzed, the alcoholysis reaction is preferably carried out in the presence of strong acid, such as sulfuric acid, ethylsulfuric acid, or p-toluenesulfonic acid. The copolymers are precipitated from the alcoholysis mixture by the addition of water, and isolated. The copolymers prepared in this way generally have unsatisfactory heat stability and tend to discolor when they are heated during processing and fabrication steps. While their degradation on heating may not detract to any appreciable extent from the physical properties of the copolymers, the discoloration seriously restricts their use in many applications. The use of organometallic and other heat stabilizers adds appreciably to the cost of the copolymers.

In our copending application Ser. No. 735,176, which was filed on June 7, 1968 which is now U.S. Pat. 3,534,008, an improved process for the production of vinyl chloride/vinyl alcohol copolymers is described. In this process a vinyl chloride/vinyl acetate copolymer is heated with a lower alkanol in the presence of a strong acid catalyst and a solvent, such as tetrahydrofuran, until alcoholysis of the vinyl acetate portions of the polymer molecule is substantially complete. To the alcoholysis mixture is added water and an amount of calcium hydroxide that is sufficient to neutralize it and to simultaneously precipitate the vinyl chloride/vinyl alcohol copolymer and stabilize it. The precipitated copolymer is then isolated, washed with water, and dried. The copolymers prepared in this way are characterized by excellent heat stability, color, clarity, adhesion, and other valuable properties.

In accordance with the present invention, it has been found that when the tetrahydrofuran that is used as the solvent in the alcoholysis step of the hereinbefore-described process is replaced by a solvent mixture comprising about 75 percent to 90 percent by weight of acetone and 10 percent to 25 percent by weight of cyclohexanone and/or tetrahydrofuran there are appreciable improvements in the efficiency and the economy of the process. Since tetrahydrofuran is a relatively expensive solvent, its complete or partial replacement by the less expensive solvents results in a sizeable reduction in the cost of the product. In addition better conversions of the vinyl chloride/vinyl acetate copolymers to vinyl chloride/vinyl alcohol copolymers are obtained when the solvent systems of this invention are used. The substitution of the solvent mixture for tetrahydrofuran in the alcoholysis step does not affect the heat stability and other properties of the resulting vinyl chloride/vinyl alcohol copolymers.

In a preferred embodiment of this invention, a vinyl chloride copolymer that contains from about 1 percent to 30 percent, and preferably 5 percent to 20 percent, of vinyl acetate is heated at a temperature in the range of about 50° C. to 80° C. with a stoichiometric excess of a lower alkanol in the presence of a strong acid catalyst and a solvent mixture comprising about 75 percent to 90 percent by weight of acetone and 10 percent to 25 percent by weight of a cyclohexanone and/or tetrahydrofuran until alcoholysis of the vinyl acetate portions of the polymer molecule is complete. To the alcoholysis reaction mixture is added an amount of a suspension of calcium hydroxide in water or a lower alkanol, such as methanol, ethanol, or isopropanol, that is sufficient to bring its pH to the range of about 5 to 9 and preferably 6 to 8 and thereby simultaneously precipitate the vinyl chloride/vinyl alcohol copolymer from solution and stabilize it. The precipitated copolymer is then isolated, washed with water, and dried.

The suspension that is used to neutralize the alcoholysis reaction mixture generally contains about 2 grams to 10 grams of calcium hydroxide per liter of water or lower alkanol. In other preferred embodiments of the invention, calcium hydroxide or calcium oxide is added to the alcoholysis mixture prior to or following the addition of sufficient water or lower alkanol to precipitate the copolymer.

The exact mechanism by which calcium hydroxide stabilizes the vinyl chloride/vinyl alcohol copolymers is not fully understood at this time. The stabilization appears to involve more than neutralization of the acidic alcoholysis catalyst and/or elimination of impurities or contaminants by complex formation or chelation since the use of other neutralizing agents, such as sodium hydroxide or ammonium hydroxide, or the use of other alkaline earth metal compounds, such as calcium chloride, barium chloride, and barium hydroxide, does not appreciably improve the heat stability of the vinyl chloride/vinyl alcohol copolymers.

The invention is further illustrated by the examples that follow. In these examples, all parts and percentages are parts by weight and percentages by weight.

EXAMPLE 1

To a solution that contained 192 parts of acetone, 24 parts of cyclohexanone, 84 parts of methanol, and 7.3 parts of concentrated sulfuric acid was added slowly 100 parts of a vinyl chloride/vinyl acetate copolymer that contained about 87 percent of vinyl chloride (Tenneco-315). During the addition of the copolymer, the solution was stirred and heated gradually to its reflux temperature. The reaction mixture was heated at its reflux temperature for 24 hours and then cooled to room temperature. After the addition of 100 ml. of methanol, the reaction mixture was neutralized to pH 7 with an aqueous suspension of calcium hydroxide (3.6 parts per 1000 parts of water) and then filtered. The alcoholyzed copolymer was washed with demineralized water and dried overnight at 45° C. Infrared analysis indicated that at least 92 percent of the vinyl acetate groups had been converted to vinyl alcohol groups.

EXAMPLE 2

The procedure of Example 1 was repeated using in place of the acetone-cyclohexanone mixture a solvent mixture containing 172.8 parts of acetone and 43.2 parts of tetrahydrofuran. Infrared analysis of the product indicated that more than 99 percent of the vinyl acetate groups had been converted to vinyl alcohol groups.

EXAMPLE 3

The procedure of Example 1 was repeated using in place of the 8:1 acetone-cyclohexanone mixture a 6:1 mixture of acetone and cyclohexanone, that is, 192 parts of acetone and 30.9 parts of cyclohexanone. The degree of conversion of the acetate to alcohol was 93.8 percent, as indicated by infrared analysis.

EXAMPLE 4

The procedure of Example 1 was repeated using in place of the 8:1 acetone-cyclohexanone mixture a 4:1 mixture of these solvents, that is, 172.8 parts of acetone and 43.2 parts of cyclohexanone. The degree of conversion of the acetate to alcohol was 94.4 percent, as indicated by infrared analysis.

EXAMPLE 5

To a solution that contained 172.8 parts of acetone, 43.2 parts of tetrahydrofuran, 84 parts of methanol, and 14.6 parts of concentrated sulfuric acid was added slowly 100 parts of a vinyl chloride/vinyl acetate copolymer that contained about 87 percent of vinyl chloride (Tenneco-315). During the addition of the copolymer, the solution was stirred and heated gradually to its reflux temperature. The reaction mixture was heated at its reflux temperature for 10 hours and then cooled to room temperature. The reaction mixture was neutralized with an excess of a calcium hydroxide suspension in isopropanol, treated with dilute hydrochloric acid to remove the calcium hydroxide, and filtered. The alcoholyzed copolymer was washed with demineralized water and dried overnight at 45° C. Infrared analysis indicated that 94.7 percent of the vinyl acetate groups had been converted to vinyl alcohol groups.

EXAMPLE 6

The procedure of Example 5 was repeated using in place of the acetone-tetrahydrofuran mixture a solvent mixture containing 172.8 parts of acetone and 43.2 parts of cyclohexanone. In this case the degree of conversion of the acetate groups to alcohol groups was 95.2 percent, as indicated by infrared analysis.

EXAMPLE 7

The thermal stability of the products of Examples 1–6 was determined by the following procedure: Each copolymer was dissolved in tetrahydrofuran. The solutions were drawn down to a 6-mil thickness on a glass plate and baked at 105° for 5 minutes. The films were then heated at 180° C. until they became discolored. In each case the products of this invention developed color in 8.0 minutes. Comparative polymers which were obtained by neutralizing an alcoholyzed vinyl chloride/vinyl acetate copolymer with either a 5 percent aqueous calcium chloride solution or a 5 percent aqueous sodium hydroxide solution had discolored after 3.0 minutes at 180° C.

The terms and expressions that have been employed herein are used as terms of description and not of limitation. There is no intention in the use of such terms and expressions of excluding any of the features shown and described or portions thereof. It is recognized that various modifications are possible within the scope of the invention claimed.

What is claimed is:
1. In the process for the production of vinyl chloride/vinyl alcohol copolymers by the alcoholysis of vinyl chloride/vinyl acetate copolymers with a lower alkanol in the presence of a strong acid catalyst and the neutralization of the alcoholysis reaction mixture with calcium hydroxide, the improvement that comprises carrying out the alcoholysis in a solvent mixture comprising about 75 percent to 90 percent by weight of acetone and 10 percent to 25 percent by weight of a solvent selected from the group consisting of cyclohexanone, tetrahydrofuran, and mixtures thereof.

2. The process of claim 1 wherein the solvent mixture contains 75 percent to 90 percent by weight of acetone and 10 percent to 25 percent by weight of cyclohexanone.

3. The process of claim 1 wherein the solvent mixture contains 75 percent to 90 percent by weight of acetone and 10 percent to 25 percent by weight of tetrahydrofuran.

4. The process of claim 1 wherein the vinyl chloride/vinyl acetate copolymer that is subjected to alcoholysis contains from about 1 percent to 30 percent of vinyl acetate.

5. The process of claim 1 wherein the vinyl chloride/vinyl acetate copolymer that is subjected to alcoholysis contains from about 5 percent to 20 percent of vinyl acetate.

6. The process of claim 1 wherein the alcoholyzing agent is methanol.

7. The process of claim 1 wherein the strong acid catalyst is sulfuric acid.

8. The process of claim 1 wherein an amount of an aqueous suspension of calcium hydroxide that will bring its pH to the range of 5 to 9 is added to the alcoholysis reaction mixture.

9. The process of claim 1 wherein an amount of an aqueous suspension of calcium hydroxide that will bring its pH to the range of 6 to 8 is added to the alcoholysis reaction mixture.

10. The process of claim 1 wherein an amount of a suspension of calcium hydroxide in isopropanol that will bring its pH to the range of 6 to 8 is added to the alcoholysis reaction mixture.

References Cited

UNITED STATES PATENTS

| | | | |
|---|---|---|---|
| 1,966,856 | 7/1934 | Groff | 106—22 |
| 2,266,996 | 12/1941 | Scott et al. | 260—87 |
| 2,365,400 | 12/1944 | Fikentscher | 260—88 |
| 2,430,372 | 11/1947 | Stamatoff | 260—90 |
| 2,512,726 | 6/1950 | Penn et al. | 260—19 |
| 3,021,318 | 2/1962 | Laporta | 260—87.1 |
| 3,111,506 | 11/1963 | Rousillon et al. | 260—87.5 |

JOSEPH L. SCHOFER, Primary Examiner

S. M. LEVIN, Assistant Examiner

U.S. Cl. X.R.

117—124; 260—87.5, 91.3